(12) United States Patent
von Helmolt et al.

(10) Patent No.: US 8,069,086 B2
(45) Date of Patent: Nov. 29, 2011

(54) SYSTEMS AND METHODS FOR TIME-DEPENDENT PROTECTION OF AVAILABLE QUANTITIES

(75) Inventors: Hans-Ulrich von Helmolt, Heidelberg (DE); Torsten Heise, Wiesloch (DE)

(73) Assignee: SAP AG, Walldorf (DE)

( * ) Notice: Subject to any disclaimer, the term of this patent is extended or adjusted under 35 U.S.C. 154(b) by 761 days.

(21) Appl. No.: 11/603,140

(22) Filed: Nov. 22, 2006

(65) Prior Publication Data

US 2007/0130024 A1    Jun. 7, 2007

(30) Foreign Application Priority Data

Dec. 5, 2005  (EP) .................................... 05111713

(51) Int. Cl.
    *G06Q 30/00*    (2006.01)
(52) U.S. Cl. ................. 705/26; 705/10; 705/22; 705/28
(58) Field of Classification Search .................. None
    See application file for complete search history.

(56) References Cited

U.S. PATENT DOCUMENTS

| | | | | |
|---|---|---|---|---|
| 6,963,847 | B1 * | 11/2005 | Kennedy et al. | 705/8 |
| 7,089,071 | B2 * | 8/2006 | Lilly et al. | 700/100 |
| 7,249,044 | B2 * | 7/2007 | Kumar et al. | 705/8 |
| 7,539,630 | B2 * | 5/2009 | Crampton et al. | 705/26.1 |
| 7,552,065 | B1 * | 6/2009 | Blanco | 705/10 |
| 7,610,212 | B2 * | 10/2009 | Klett et al. | 705/8 |
| 2004/0098403 | A1 * | 5/2004 | Gupta et al. | 707/102 |
| 2005/0165629 | A1 * | 7/2005 | Bruns | 705/6 |
| 2005/0216325 | A1 * | 9/2005 | Ziad et al. | 705/8 |

* cited by examiner

*Primary Examiner* — Luna Champagne
(74) *Attorney, Agent, or Firm* — Finnegan, Henderson, Farabow, Garrett & Dunner, LLP

(57) ABSTRACT

Methods and systems are disclosed for processing a product order. In one implementation, a method is provided that includes receiving a product order from a customer and determining, based on the received product order, at least one of a date on which the products should be available at a location and a date by which the products should be issued out of the location. The method may also include calculating, based on the determined date, a sourcing due date on which to initiate sourcing, and performing an availability check for the ordered products on the basis of the dates when the sourcing due date is earlier than a predetermined date.

15 Claims, 5 Drawing Sheets

SYSTEMS AND METHODS FOR TIME-DEPENDENT PROTECTION OF AVAILABLE QUANTITIES

TECHNICAL FIELD

The present invention relates generally to the field of data processing and, in particular, to methods and systems for processing product orders within e-business systems.

BACKGROUND

The success of a business depends essentially on the requirement that customer demands for goods and/or services be fulfilled precisely, cost-efficiently, and on time. Therefore, many businesses make use of a supply chain management system to control and optimize their production and delivery processes.

Supply chain management may include the process of coordinating the flow of goods, services, information and/or finances between the involved parties, such as manufactures, suppliers, wholesalers, retailers, and consumers. This process may include, for example, order processing, information feedback, and timely delivery of ordered goods and/or services.

One process within supply chain management is checking whether a quantity of products ordered by a customer is available at some location at a given date. This check is also referred to as an available-to-promise (ATP) check.

A future demand for a product may consume the available quantity of the product during an ATP check. As a result, the ATP check of another requirement for the same product that is needed by a customer earlier may not be completely confirmed because the previously checked ATP requirement may have consumed the available quantity.

SUMMARY

In accordance with embodiments of the present invention, a method is provided for processing a product order. The method may include receiving a product order from a customer and determining, based on the received product order, at least one of a date on which the products should be available at a location and a date by which the products should be issued out of the location. The method may also include calculating, based on the determined date, a sourcing due date on which to initiate sourcing, and performing an availability check for the ordered products on the basis of the dates when the sourcing due date is earlier than a predetermined date.

In accordance with embodiments of the invention, the predetermined date may be the date of processing the product order. The method may further include performing an availability check at a given later date when the sourcing due date is later than the predetermined date.

In accordance with further embodiments of the invention, the dates may further comprise time points. In addition, in accordance with the method, a date may be determined on which the products should be ready to be loaded for transport, a date may be determined on which the transported products should be unloaded at the customer, and/or a date may be determined from which organization of transport of the products should begin.

Consistent with additional embodiments of the invention, a computer-readable medium may be provided. The computer readable medium may include computer-executable instructions which, when executed by a processor, perform a method including receiving a product order from a customer and determining, based on the received product order, at least one of a date on which the products should be available at a location and a date by which the products should be issued out of the location. The method may also include calculating, based on the determined date, a sourcing due date on which to initiate sourcing, and performing an availability check for the ordered products on the basis of the dates when the sourcing due date is earlier than a predetermined date.

In accordance with embodiments of the invention, a system may be provided for processing a product order. The system may include means for receiving a product order from a customer and means for determining, based on the received product order, at least one of a date on which the products should be available at a location and a date by which the products should be issued out of the location. The system may further include means for calculating, based on the determined date, a sourcing due date on which to initiate sourcing and means for performing an availability check for the ordered products on the basis of the determined dates when the sourcing due date is earlier than a predetermined date.

Consistent with the invention, before an ATP check is performed, a new date type may be calculated (e.g., a sourcing due date) based on a given time point, such as the requested delivery date or the material availability date. If the calculated sourcing due date is earlier than a given time limit (e.g., the actual date and time), the ATP check may be performed in the normal way and the requirement may be confirmed. If the sourcing due date is later than the time limit, no ATP check may be performed for such a requirement and the available quantity may be used to confirm another, earlier-needed requirement. Accordingly, the available quantity may be protected before being consumed by requirements needed in the future.

Until now the only way to confirm early needed requirements before later needed requirements that were previously created was to backorder process all requirements of a product with a sort profile depending on the material availability date. By using the sourcing due date, the probability to get a confirmation of an early-needed requirement may be higher than without using the sourcing due date. Therefore, early-needed requirements may be confirmed during creation of the requirement, without waiting for a sort of backorder processing to redistribute the available quantity from the later to the earlier requirements.

BRIEF DESCRIPTION OF DRAWINGS

The accompanying drawings, which are incorporated in and constitute a part of this specification, illustrate embodiments consistent with the invention and together with the description, serve to explain the principles of the invention.

In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
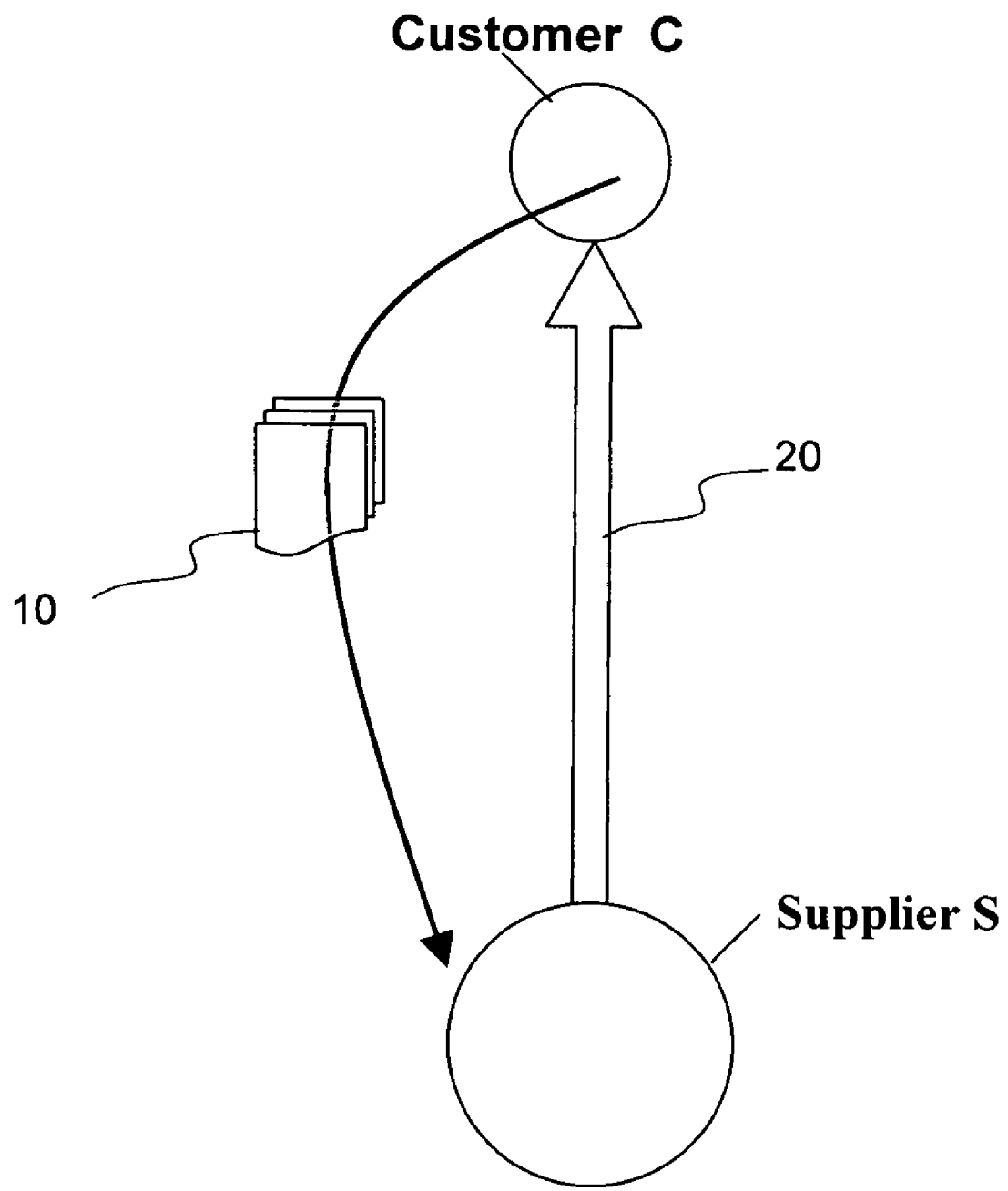
FIG. 1 illustrates an exemplary order and delivery process between customer and supplier, consistent with an embodiment of the invention.

FIG. 1 illustrates an exemplary order and delivery process between a customer ("Customer C") and a supplier ("Supplier S"). Customer C may send an order 10 to the supplier S. Order 10 may be, for example, an electronic order transmitted through an online transaction processing system or a traditional order transmitted by mail. Order 10 may include, for example, information about the ordered product and the ordered quantity.

Upon receiving the customer order 10, an availability or available-to-promise (ATP) check may be performed. The ATP check may use time series buckets to store the information about receipt and requirement elements. Receipt elements may be products or goods that are available for consumption to satisfy one or more requirement elements, i.e., orders. If supplier S can provide the required quantity of products, the ATP check may confirm the order, and the products may be delivered at a given time as illustrated at item 20 in FIG. 1.

Figure 2:
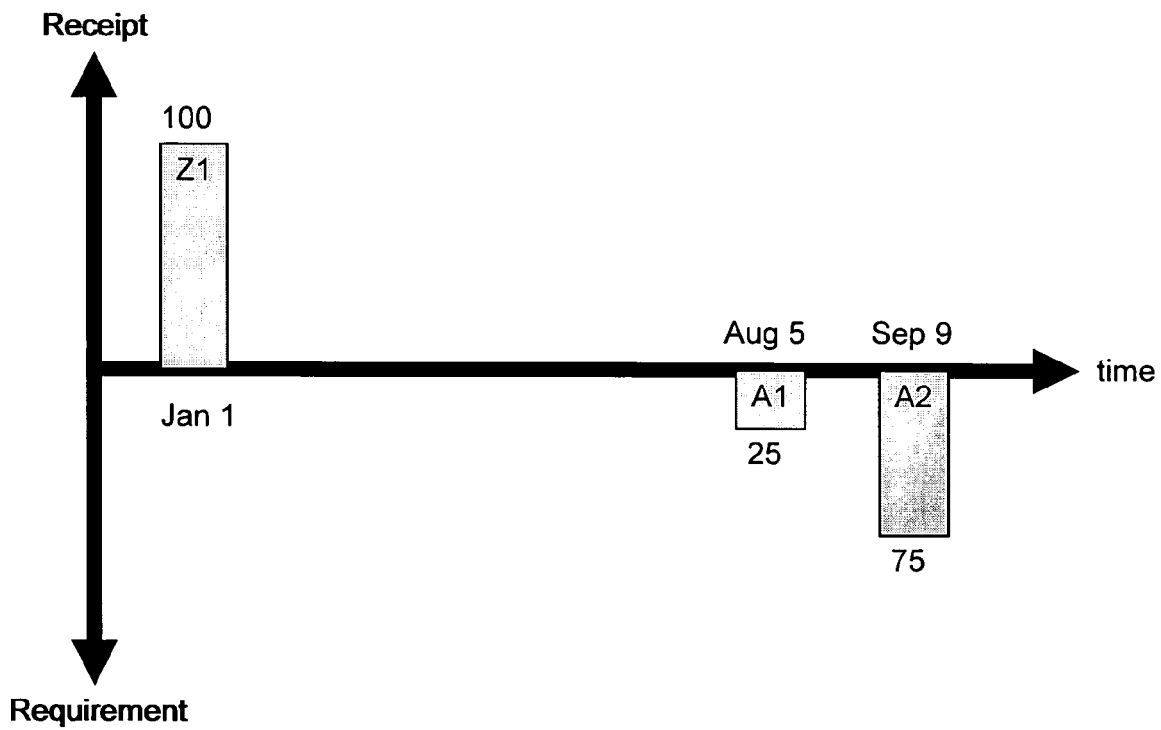
FIG. 2 illustrates an exemplary situation of a product availability check, consistent with an embodiment of the invention.

FIG. 2 illustrates, consistent with an embodiment of the invention, an exemplary situation of a product availability or ATP check within a supply chain management system. The receipt element Z1 may represent a quantity of products available at a location for performing the ATP check. The requirements A1, A2 may represent ordered quantities of products, e.g., quantities needed at a given date. The term "date" may specify, for example, either a day of the year, a time point of a day, or both day and time point.

In the example of FIG. 2, 100 pieces of a product are available for receipt element Z1 at January 1, and requirement elements include A1 (25 pieces, required at August 5) and A2 (76 pieces, required at September 9). In this example, receipt element Z1 may exactly satisfy the two requirements A1, A2 as follows: if receipt element Z1 is counted as a positive quantity and the requirements are counted as negative quantities, the sum is zero: 100−(25+75)=0.

Figure 3:
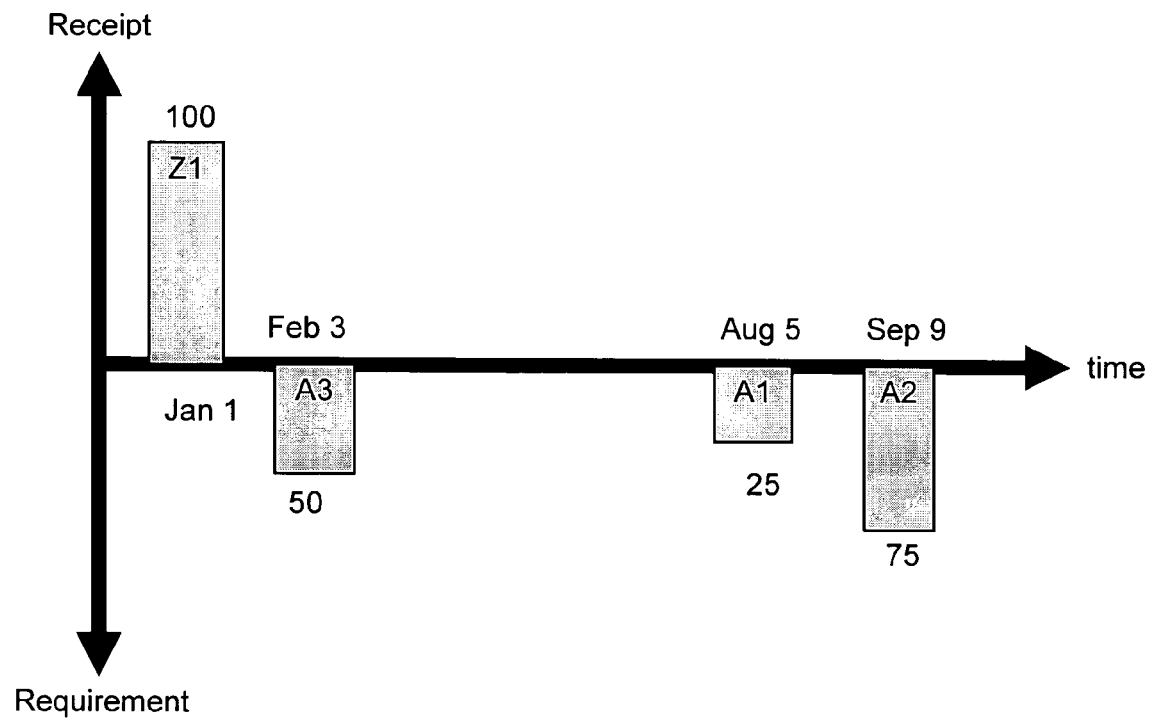
FIG. 3 illustrates another exemplary situation of a product availability check, consistent with an embodiment of the invention.

Assume that a third requirement A3 of 50 pieces is generated, such as a requirement of a new created sales order as illustrated in FIG. 3. In this example, the receipt element Z1 cannot satisfy this requirement, even if the date of this requirement is, for example, February 3 (that is, before the dates of requirement elements A1 and A2). Receipt element Z1 cannot satisfy this requirement because the sum of the receipt and requirement elements would be negative: 100−(25+75+50)=−50. A3 may not be confirmed because, in this example, A3 may be the last requirement created.

Consistent with embodiments of the invention, different date types before and within the actual ATP check may be determined. For such a determination, different durations, working times, and time zones may be used that can be determined in various ways, such as by condition technique, product-location master data, and transportation lanes. One or more of the following exemplary date types may be determined: Material Availability Date (MBDAT); Loading Date (LDDAT); Goods Issue Date (WADAT); Delivery Date (LFDAT); Unloading Date (ELDAT); and Transport Dispo Date (TDDAT).

Figure 4:
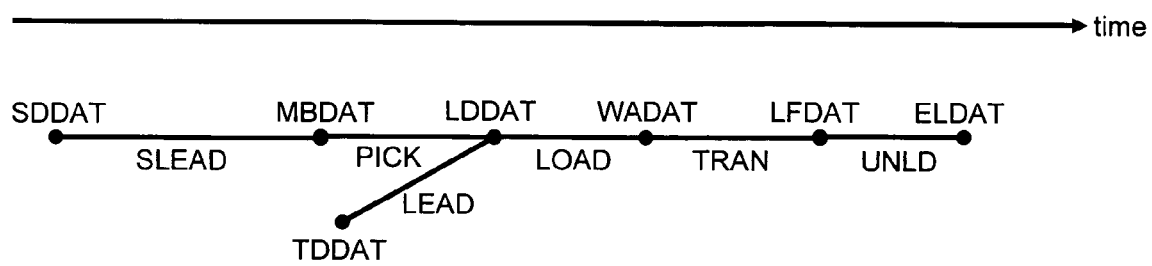
FIG. 4 illustrates exemplary scheduling of dates and activities over the time, consistent with an embodiment of the invention.

These dates may identify when to initiate specific activities related to fulfilling the order. The scheduling of these dates and activities over the time t is illustrated in FIG. 4. These exemplary activities are as follows: at the Material Availability Date (MBDAT), the required quantity of products has to be available at the location at some storage place. Next, picking may be started, that is, products may be removed from the storage location. This activity has to be accomplished by the Loading Date (LDDAT). At Transport Dispo Date (TDDAT), the transportation means must be prepared (Lead).

The Loading Date (LDDAT) may be the initiation of loading the products onto the transport means. The activity of loading the products is illustrated as LOAD (FIG. 4). Consistent with embodiments of the invention, loading has to be finished at the Goods Issue Date (WADAT), which is the date when the products leave the site for transportation (TRAN) to the destination. The destination is to be reached at the Delivery Date (LFDAT). Once the products arrive at the destination, unloading may begin (UNLD), which has to be ended at unloading date (ELDAT).

The different date types and their connections to each other together with the durations, working times, and time zones may be denoted in the following exemplary scheduling processing scheme. For the ATP check, the material availability date (MBDAT) may be used. If the ATP check cannot confirm the requirement at this date, but at a later one, the scheduling may be called again in order to recalculate all date types based on the material availability date given by the ATP. The confirmed dates may be returned to the calling application or system.

Consistent with embodiments of the invention, the standard scheduling processing scheme may be enhanced by adding new date types and activities. As further disclosed herein, a new scheduling processing scheme may be obtained which determines the standard date types and additionally a new date type, the Sourcing Due Date (SDDAT).

The ATP process may include preparing the data for the ATP check, executing the ATP check, and preparing the results of the ATP check. In the first step of preparing the data for the ATP check (e.g., before execution of the actual ATP check), a routine may be called in which the scheduling processing may be performed for each requirement to determine the set of date types starting from a given date, e.g., the delivery date (LFDAT). The routine may calculate the date types as mentioned above: Unloading Date (ELDAT), Delivery Date (LFDAT), Goods Issue Date (WADAT), Loading Date (LDDAT), Material Availability Date (MBDAT), Transport Planning Date (TDDAT).

Furthermore, the new introduced Sourcing Due Date (SDDAT) may be calculated. For calculating the Sourcing Due Date special logic may be implemented within this routine. The Sourcing Due Date may be used in the following way: a calculated Sourcing Due Date in the past may not trigger an automatically forward scheduling. For example, only if one of the other dates, e.g., the Material Availability Date is in the past, then the scheduling may shift the corresponding date, e.g., the Material Availability Date, to now and start the scheduling from there again. The Sourcing Due Date may remain in the past.

After the scheduling is performed, the Sourcing Due Date may be compared with now, e.g., the current date. There are two different possibilities of this comparison:

(1) The Sourcing Due Date is less or equal now, e.g., in the past, or now; or
(2) The Sourcing Due Date is greater than now, e.g., in the future.

In the first case the ATP check may be performed. In the second case, the requirement may not checked by the ATP checking procedure, and the confirmed quantity may be zero. The receipt elements can be used to confirm other requirements which must be satisfied earlier, that is, requirements with a Sourcing Due Date less than or equal to now or requirements without a Sourcing Due Date.

Figure 5:
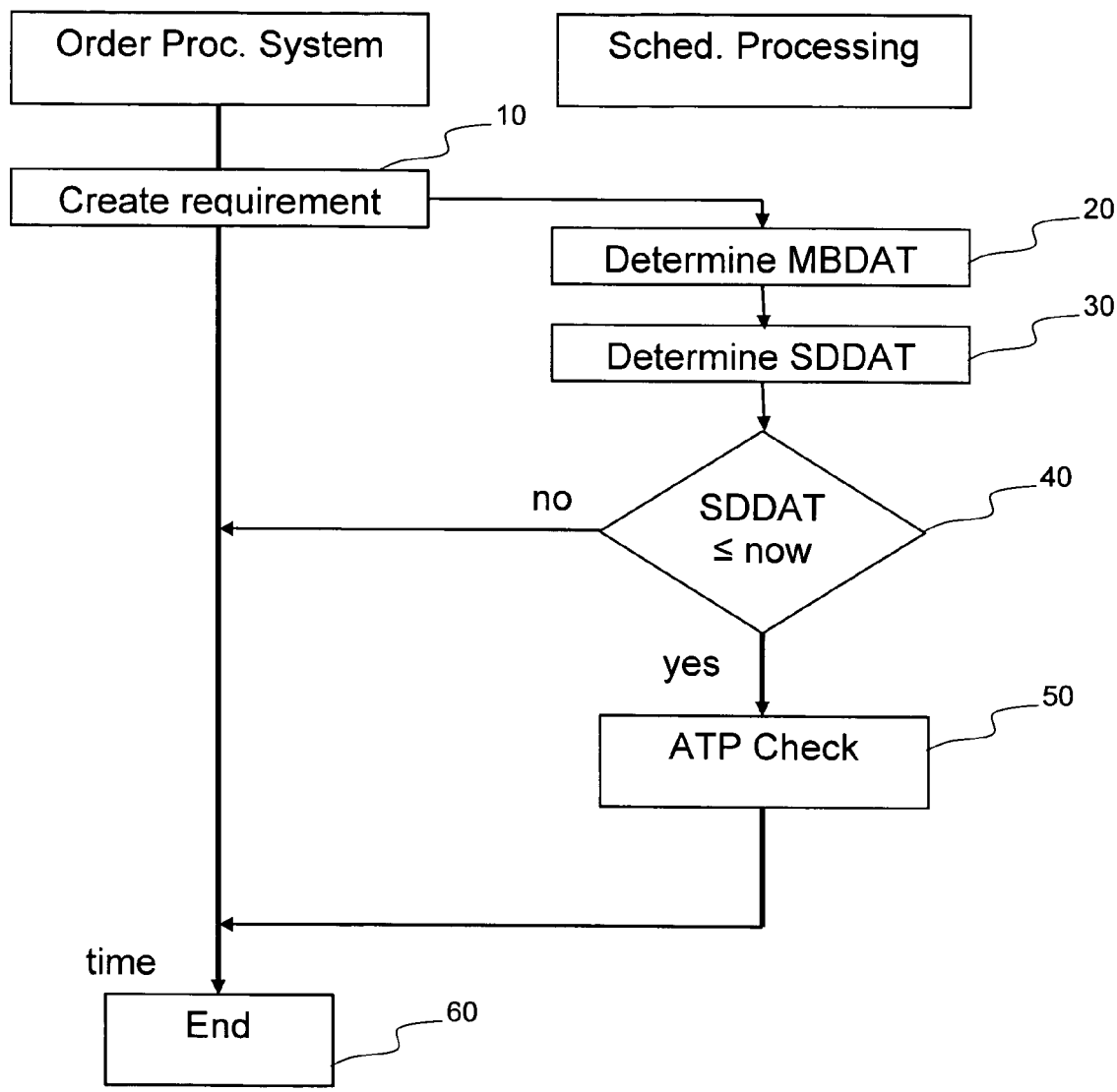
FIG. 5 illustrates an exemplary program flow, consistent with an embodiment of the invention.

FIG. 5 illustrates an exemplary flowchart consistent with embodiments of the invention. In step 10, the supplier may receive a product order from a customer. The product order may be processed by an order processing system of the supplier and cause a requirement to be created. Based on the received order, step 20 may be performed to determine, based on the received product order, at least one of a date on which the products should be available at a location and a date by which the products should be issued out of the location.

Next, step 30 may be executed which includes determining, on the basis of the at least one date determined in step 20, a date SDDAT at which sourcing should be initiated.

At step 40, a check may be performed as to whether the sourcing due date SDDAT is earlier (e.g., lower) than, or equal to, a predetermined date. If so, an availability or ATP check may be performed for the ordered products on the basis of the dates determined in the preceding steps (step 50). Otherwise, if the sourcing due date SDDAT is later than a predetermined date, no availability check may be done at this time, and the method may end (step 60). The predetermined date can be the date of processing the product order, i.e., the current date.

A further embodiment consistent with the invention may provide a step of initiating a process which performs an availability check at a given later date if, in step 40, the Sourcing Due Date is later than the predetermined date. This process may include back order processing.

The present techniques can be implemented in digital electronic circuitry, or in computer hardware, firmware, software, or in any suitable combinations thereof. Apparatus consistent with the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. Embodiments of the invention may be implemented in one or several computer programs that are executable in a programmable system, which may include at least one programmable processor coupled to receive data from, and transmit data to, a storage system, at least one input device, and at least one output device. Computer programs may be implemented in a high-level or object-oriented programming language and/or in assembly or machine code. The language or code can be a compiled or interpreted language or code. Processors may include general and special purpose microprocessors. A processor may receive instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, embodiments of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analog or digital form over at least one communication link. Such a communication link may be a serial link, a parallel link, local area network, or wireless link (e.g. an RF communication link). A display may be coupled to an interface, which may be coupled to an I/O bus. A keyboard and pointing device may also coupled to the I/O bus. Alternatively, separate buses may be used for the keyboard pointing device and I/O interface.

In the foregoing specification, aspects of the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

Other embodiments of the invention will be apparent to those skilled in the art from consideration of the specification and practice of the embodiments and features of the invention disclosed herein. It is intended, therefore, that the specification and embodiments be considered as exemplary only, with a true scope and spirit of the invention being indicated by the following claims.

What is claimed is:

1. A method for processing a product order, the method comprising:

receiving a product order from a customer;

determining, based on the received product order, at least one of a date on which the products should be available at a location and a date by which the products should be issued out of the location;

calculating, based on at least one of the determined date on which the products should be available at the location and the determined date by which the products should be issued out of the location, a sourcing due date on which to determine at least one source from which the products may be obtained;

comparing the sourcing due date to the date of processing the product order;

performing, by using a processor, an availability check for the ordered products on the basis of the at least one determined date if the sourcing due date is earlier than the date of processing the product order; and performing, by using a processor, the availability check after the date of processing the product order if the sourcing due date is later than the date of processing the product order.

2. The method of claim 1, wherein the at least one determined date further comprises time points.

3. The method of claim 1, further comprising determining a loading date on which the products should be ready to be loaded for transport.

4. The method of claim 1, further comprising determining an unloading date on which the transported products should be unloaded at the customer.

5. The method of claim 1, further comprising determining an organization date for beginning organization of transport of the products.

6. A system for processing a product order, the system comprising:
   a processor;
   a memory storing instructions that cause the processor to perform a method comprising:
      receiving a product order from a customer;
      determining, based on the received product order, at least one of a date on which the products should be available at a location and a date by which the products should be issued out of the location;
      calculating, based on at least one of the determined date on which the products should be available at the location and the determined date by which the products should be issued out of the location, a sourcing due date on which to determine at least one source from which the products may be obtained;
      comparing the sourcing due date to the date of processing the product order;
      performing an availability check for the ordered products on the basis of the at least one determined date if the sourcing due date is earlier than the date of processing the product order; and
      performing the availability check after the date of processing the product order if the sourcing due date is later than the date of processing the product order.

7. The system of claim 6, wherein the at least one determined date further comprises time points.

8. The system of claim 6, wherein the method performed by the processor further comprises determining a loading date on which the products should be ready to be loaded for transport.

9. The system of claim 6, wherein the method performed by the processor further comprises determining an unloading date on which the transported products should be unloaded at the customer.

10. The system of claim 6, wherein the method performed by the processor further comprises determining an organization date for beginning organization of transport of the products.

11. A computer-readable medium comprising computer-executable instructions which, when executed by a processor, perform a method comprising:
    receiving a product order from a customer;
    determining, based on the received product order, at least one of a date on which the products should be available at a location and a date by which the products should be issued out of the location;
    calculating, based on the at least one determined date on which the products should be available at a location and the determined date by which the products should be issued out of the location, a sourcing due date on which to determine at least one source from which the products may be obtained;
    comparing the sourcing due date to the date of processing the product order;
    performing an availability check for the ordered products on the basis of the at least one determined date if the sourcing due date is earlier than the date of processing the product order; and
    performing the availability check after the date of processing the product order if the sourcing due date is later than the date of processing the product order.

12. The computer-readable medium of claim 11, wherein the at least one determined date further comprises time points.

13. The computer-readable medium of claim 11, wherein the method further comprises determining a loading date on which the products should be ready to be loaded for transport.

14. The computer-readable medium of claim 11, wherein the method further comprises determining an unloading date on which the transported products should be unloaded at the customer.

15. The computer-readable medium of claim 11, wherein the method further comprises determining an organization date for beginning organization of transport of the products.

* * * * *